United States Patent
Majima et al.

(10) Patent No.: US 8,939,511 B2
(45) Date of Patent: Jan. 27, 2015

(54) LOCK MECHANISM FOR AUTOMOBILE REAR SEAT

(75) Inventors: Sanji Majima, Tokyo (JP); Ken Kuroiwa, Tokyo (JP); Akira Ogiso, Tokyo (JP); Kiyohiko Kamata, Kanagawa (JP); Hiroyuki Nozaki, Tokyo (JP)

(73) Assignees: Mitsubishi Jidousha Kogyo Kabushiki Kaisha (JP); Mitsui Kinzoku Act Corporation (JP); Tachi-S Co., Ltd. (JP)

( * ) Notice: Subject to any disclaimer, the term of this patent is extended or adjusted under 35 U.S.C. 154(b) by 94 days.

(21) Appl. No.: 13/576,350

(22) PCT Filed: Feb. 15, 2011

(86) PCT No.: PCT/JP2011/053132
§ 371 (c)(1),
(2), (4) Date: Sep. 6, 2012

(87) PCT Pub. No.: WO2011/099621
PCT Pub. Date: Aug. 18, 2011

(65) Prior Publication Data
US 2013/0009440 A1      Jan. 10, 2013

(30) Foreign Application Priority Data

Feb. 15, 2010   (JP) .................................. 2010-030508

(51) Int. Cl.
*B60N 2/20*     (2006.01)
*B60N 2/36*     (2006.01)
*B60N 2/22*     (2006.01)

(52) U.S. Cl.
CPC .............. *B60N 2/366* (2013.01); *B60N 2/2245* (2013.01)
USPC ................................... 297/378.13; 296/65.16

(58) Field of Classification Search
USPC ...................................... 297/378.13; 296/65.16
See application file for complete search history.

(56) References Cited

U.S. PATENT DOCUMENTS

| | | | |
|---|---|---|---|
| 6,705,679 B1 * | 3/2004 | Zelmanov et al. | 297/378.13 |
| 6,733,078 B1 * | 5/2004 | Zelmanov | 297/378.1 |
| 7,338,128 B2 * | 3/2008 | Inoue et al. | 297/378.13 |
| 7,404,605 B2 * | 7/2008 | Inoue et al. | 297/378.13 |
| 7,410,217 B2 * | 8/2008 | Inoue et al. | 297/378.13 |

(Continued)

FOREIGN PATENT DOCUMENTS

| | | | | |
|---|---|---|---|---|
| FR | 2 892 984 | | 5/2007 | |
| JP | 2001341558 A | * | 12/2001 | ............... B60N 2/22 |

(Continued)

*Primary Examiner* — Peter Brown
(74) *Attorney, Agent, or Firm* — Ostrolenk Faber LLP

(57) ABSTRACT

A first and a second surface of a latch for a seat permit sliding passage of the latch relative to a front leg of a striker, upon contact of the front leg with either of the first and second surfaces. A third surface in a containing space of the latch stops the latch by contacting the front leg. The third surface is arranged such that a rear leg of the striker is brought in alignment with a lock groove of the latch upon contact of the front leg with the third surface. The latch can be guided along the second surface when the second surface contacts the front leg, so that the second surface slides on and past the front leg. By continuously unfolding the seat back upwards until the third surface contacts the front leg, the seat back can be set to a design reference position.

1 Claim, 5 Drawing Sheets

(56) References Cited

U.S. PATENT DOCUMENTS

| | | | |
|---|---|---|---|
| 7,494,187 B2 * | 2/2009 | Inoue et al. | 297/378.13 |
| 7,578,558 B2 * | 8/2009 | Tanaka | 297/378.13 |
| 7,740,317 B2 * | 6/2010 | Yamada et al. | 297/378.13 |
| 7,762,604 B1 * | 7/2010 | Lindsay | 296/64 |
| 8,066,328 B2 * | 11/2011 | Lindsay | 297/378.13 |

FOREIGN PATENT DOCUMENTS

| | | | | |
|---|---|---|---|---|
| JP | 2002-51866 | | 2/2002 | |
| JP | 2003146126 A | * | 5/2003 | ............ B60N 2/36 |
| JP | 2006-248330 | | 9/2006 | |
| JP | 2007-196717 | | 8/2007 | |
| JP | 2008-296686 | | 12/2008 | |

* cited by examiner

LOCK MECHANISM FOR AUTOMOBILE REAR SEAT

CROSS REFERENCE TO RELATED APPLICATIONS

The present application is a 35 U.S.C. §371 National Phase conversion of PCT/JP2011/053132, filed Feb. 15, 2011, which claims benefit of Japanese Application No. 2010-030508, filed Feb. 15, 2010, the disclosures of which are incorporated herein by reference. The PCT International Application was published in the Japanese language.

TECHNICAL FIELD

The present invention relates to a lock mechanism for locking and unlocking an automotive seat. More specifically, the invention is directed to a lock mechanism for use with a fold-down type of rear seat having a seat back that can be either folded down or unfolded upwardly to an upright position, wherein the lock mechanism is operable to lock such seat back of rear seat at the upright position.

BACKGROUND OF THE INVENTION

In many of vehicle seats, there has been widely used a fold-down type of rear seat wherein the seat back thereof can be folded forwardly and downwardly in order to widen a load or luggage space (luggage room) behind the rear seat. (For example, reference is made to the Japanese Laid-Open Patent Publication No. 2008-296686)

In general, according to such fold-down rear seat, a lock mechanism is provided to an upper end region of a lateral wall of the seat back thereof, and a latch rotatably provided in that lock mechanism may be engaged with a striker fixed on a side wall of a vehicle, in an embracing manner, to thereby lock the seat back at an upright position where the seat back is set in a vertically extending state (i.e. a position where a seat occupant can sit on the rear seat). With this locking operation, the seat back is prevented from being folded forwardly and downwardly from the upright position.

Basic construction of the above-stated lock mechanism is known well. Briefly stated, the lock mechanism is provided as one pre-assembled unit which comprises a base plate, a cover plate and a latch, such that the latch is rotatably interposed between the base plate and the cover plate and that a guide surface defined in the outer edge of the latch is exposed from a cut-away portion formed in those base and cover plates. Further, the latch is formed with a lock groove which assumes a shape of an elongated hole, and such lock groove is defined in the latch at a point behind or at the rear of the guide surface. A biasing force is applied to the latch, so that the lock groove of the latch is kept in engagement with and over the striker in an embracing manner, thereby locking (or retaining) the seat back of the rear seat at the upright position.

A direction of the afore-said biasing force, therefore, corresponds to a direction in which the lock groove embracingly engages the striker. Hence, for example, upon pressing an unlocking button for lock-off operation to unlock the latch temporarily, the latch may be rotated in a direction to overcome such biasing force to disengage the lock groove of the latch from the striker (which means that the seat back can be unlocked), thereby permitting the seat back to be folded downwardly from the upright position.

SUMMARY OF THE INVENTION

The striker stated earlier is normally formed in a substantially "U" shape having a pair of spaced-apart legs which are both to be disposed along forward and rearward directions of a vehicle or automobile. With such striker's configuration in view, one forwardly-disposed leg or front leg of the striker can be used for locking the seat back at a forward lock point situated relatively forward of the vehicle, thereby retaining the seat back at a certain angle of forward inclination, whereas the other rearwardly-disposed leg or rear leg of the striker can be used for locking the seat back at a rearward lock point situated rearwardly of the vehicle, thereby retaining the seat back at a certain angle of rearward inclination. Such two-step locking arrangement has been adopted increasingly among fold-down types of vehicle seats which allow the respective seat backs thereof to be folded in forward and downward directions.

With regard to the foregoing ordinary two-step lock mechanism, FIG. 6(A) to FIG. 6(E) illustrate operative actions of a latch provided in the lock mechanism. Referring to those Figures, a description will be made as to how the latch is moved and operated in this conventional two-step lock mechanism.

A conventional two-step lock mechanism 120, provided to an upper end region in one lateral wall of a seat back, has a latch 122 rotatably arranged therein, such that the latch is rotatable about an axis of rotation 128. A biasing force F is applied by a biasing means (not shown) to that latch in a clockwise direction as indicated by the arrow.

The latch 122 has three different surfaces 122a1 to 122a3 which may each be biasingly contacted by a front leg 130F of a striker 130 fixed on a side wall of vehicle body. The first surface 122a1 is defined in an outermost edge of the striker and thus situated most remote from the axis of rotation 128. This first surface serves as a guide surface. On the other hand, the second surface 122a2 is shown to be situated at the rear of or behind the first surface (i.e. nearer to the axis of rotation 128 of the latch) and may serve as a stopper (non-guide surface).

The first surface 122a1, which serves as a guide surface, is so formed to provide a substantially arcuate and sloped surface, for instance. Such first surface is normally positioned at a point where it is exposed from a cut-away region 125 formed in a base plate as well as in a cover plate. When the seat back is unfolded upwardly from a folded-down state thereof, the first surface is brought into contact with the front leg 130F of the striker 130 fixed on the side wall of vehicle body. (See FIG. 6(A)) Then, along that first surface 122a1 (guide surface), the latch 122 is guided relative to the striker and rotated against the biasing force F in a direction away from the front leg 130F. In other words, the latch is rotated counterclockwise about the axis of rotation 128. (See FIG. 6(B))

With the foregoing rotation of the latch 122 away from the front leg 130F, when the first surface thereof has slid on and past the front leg 130F, the second surface 122a2 situated at the rear of the first surface is brought into contact with the front leg. (See FIG. 6(C)) This second surface 122a2 is formed as a surface (non-guide surface) that prevents the above-described counterclockwise rotation of the latch (or prevents rotation of the latch in a direction away from the front leg), even when the second surface is strongly pressed against and contacted by the front leg. The second surface is so formed to provide a plane which rectilinearly extends in a direction substantially orthogonal to a direction of a reaction force caused exerted by the front leg on the second surface. Otherwise stated, an angle θ between a line of the reaction force exerted by the front leg 130F and the second surface 122a2 is approximately 90 degrees, and therefore the line of the reaction force is oriented toward a center of the axis of rotation 128. Due to this fact, even when the second surface is strongly pressed against and contacted by the front leg, the latch 122 can not be rotated counterclockwise sufficiently to overcome the biasing force F. Hence, the latch is prevented from moving relative to the striker, which means that the seat back is prevented from being further unfolded upwardly (or prevented from being inclined further rearwardly).

In the latch 122 a lock groove 122*b* is also formed that assumes a shape of elongated hole, in such a manner that the lock groove 122*b* is situated between the first surface 122*a*1 which serves as a guide surface and the second surface 122*a*2 which serves as a non-guide surface, wherein the second surface is situated at the rear of the first surface as stated above. Due to such arrangement, when the first surface 122*a*1 slides on and past the front leg 130F, followed by contact of the second surface 122*a*2 with that front leg 130F, the latch is therefore prevented from moving any further. In other words, the seat back is prevented from further upward unfolding (or prevented from further rearward inclination). At that moment, the biasing force F causes the latch 122 to rotate clockwise, which results in the front leg being inserted in and retained by the lock groove 122*b* in an embraced manner. Thus, the lock mechanism 120 has now done its locking action at the previously defined forward lock point. In other words, the seat back is locked at that forward lock point. Therefore, according to this conventional ordinary two-step lock mechanism, the seat back, when unfolded towards the upright position, is brought to the forward and rearward lock points that have been explained earlier, and at first, the seat back is locked at the forward lock point which is therefore a first locked position (or a first retained position) of the seat back.

In order to unlock the seat back from the aforementioned forward lock point (or in order to forcibly rotate the latch 122 against the biasing force F to the extent that the second surface 122*a*2 thereof is brought out of contact with the front leg 130F of the striker), the seat back should be moved further upwardly from the forward lock point (or the seat back be further inclined rearwardly therefrom). Thus, by continuing the upward unfolding of seat back, the second surface 122*a*2 of the latch slides on and past the front leg of the striker, while the center of rotation of the latch moves towards the front leg, with the result that the latch is rotated clockwise under the biasing force, while being moved on and along the striker, and eventually returned to a home position of the latch. By further unfolding the seat back upwardly (i.e. by further inclining the seat back rearwardly), the first surface (guide surface) 122*a*1 of the latch 122 is brought to contact with the rear leg 130R of the striker, and then, such first surface 122*a*1 slides on and past the rear leg, with the latch per se being simultaneously rotated along the contour of that first surface relative to the striker. Thereafter, the second surface 122*a*2 is brought into contact with the rear leg. (See FIG. 6(E)) As stated previously, the second surface 122*a*2 is a surface (non-guide surface) that prevents the latch from rotating counterclockwise (i.e. against rotation in a direction away from the striker). Hence, the contact of that second surface with the rear leg prevents movement of the latch relative to the sticker. In other words, the seat back is prevented from further upward unfolding (or prevented from further rearward inclination). Therefore, the lock mechanism now completes its locking action at the rearward lock point stated previously, so that the seat back is retained (or locked) at the rearward lock point.

With the above-constructed two-step lock mechanism, the seat back can be retained at either of forward and rearward positions (or either of the forward and rearward lock points). In general, when designing a certain seat back incorporating such two-step lock mechanism, the rearward lock point in the lock mechanism must be defined as a reference position of the seat back (i.e. a design reference position). Thus, for example, at the step of installing a rear seat in a vehicle body and setting the rear seat therein under an initial condition, it is required to set a seat back of the rear seat at the rearward lock point of the lock mechanism, wherein the rearward lock point is the design reference position as stated above. However, according to a seat back provided with this kind of conventional two-step lock mechanism, it is inevitable that the seat back will first be locked at the forward lock point. Thus, the forward lock point of the lock mechanism is a first lock position for locking the seat back. Therefore, setting the rear seat in a vehicle body under an initial condition requires the steps of: locking the seat back of the rear seat at the forward lock point; thereafter, effecting a lock-off operation for unlocking the latch temporarily at that forward lock point; and then, moving the seat back further upwardly (or inclining the seat back further rearwardly) towards the rearward lock point. As a result thereof, with this known lock mechanism, a process of setting the seat back at a design reference position will inevitably become slow and inefficient, thus making it difficult to smoothly install the seat back in a vehicle body.

As described above, the conventional two-step lock mechanism has a problem that, at the stage of setting a seat back at a design reference position, the seat back has first to be locked at the forward lock point, with the result that, each time a rear seat is installed in a vehicle body, it is necessary to lock and unlock the seat back thereof at the forward lock point before locking the seat back at the rearward lock point, which makes it impossible to rapidly install the rear seat in the vehicle body.

It is therefore a purpose of the present invention to provide a lock mechanism for use with a rear seat, which allows rapid setting of a seat back of rear seat at a design reference position at the step of installing the rear seat in a vehicle body.

In order to achieve the foregoing purpose, the present invention defines a lock mechanism for use with a rear seat, which is provided to a lateral portion of a seat back of the rear seat, wherein the seat back is foldable forwardly and downwardly, the lock mechanism including: a latch workable for engagement with one of the pair of front aid rear leg portions of a striker under a biasing force, the latch having: a first surface defined in the outer edge thereof; a lock groove defined at a point behind the first surface, the lock groove being adapted for allowing one of the pair of front and rear leg portions to be engaged therein in an embraced manner; a second surface defined in an inner edge of the lock groove; and a containing space defined at a point behind said second surface, said containing space being adapted for allowing the front leg portion of the pair of front and rear leg portions to be contained therein, wherein the first and second surfaces of the latch are each formed as a permitting guide surface which permits passage of the latch from the front leg portion, upon the front leg portion being contacted with one of the first and second surfaces, wherein a third surface is defined in an inward edge of the containing space of the latch, wherein the third surface serves as a stopper adapted for non-sliding contact with the front leg portion to stop the latch, and wherein the third surface is arranged in the inward edge of the containing space at a point where said front leg portion of the striker is to contact the third surface, while the rear leg portion of the striker is to be brought in alignment with the lock groove upon contact of the front leg portion with the third surface.

According to the invention the second surface is also formed as a permitting guide surface, as similar to the first surface. This arrangement permits the second surface to slide on and past the front leg of the striker, even when the second surface is forcibly contacted by that front leg, which therefore insures permitting the lock groove to be displaced past the front leg, without being stopped at any point of alignment with the front leg. Further, according to the invention, at the point where the third surface is contacted by the front leg, the latch is prevented from moving relative to the striker, while the rear leg of the striker is brought in alignment with the lock groove. With this arrangement, a first lock position of the lock mechanism to the striker can be set at the previously stated rearward lock point. Accordingly, at the step of installing the rear seat in a vehicle body, it is possible to rapidly set and retain the seat back thereof at a design reference position, without any lock-off operation.

BRIEF DESCRIPTION OF THE DRAWINGS

FIGS. 3(A) and 3(B) are, respectively, a partly broken schematic plan view of the rear seat and a perspective view of a striker provided on a side wall of vehicle body.

FIGS. 5(A) to 5(F) show actions of a latch in the lock mechanism in accordance with the present invention.

FIGS. 6(A) to 6(E) show actions of a latch in a conventional lock mechanism.

DESCRIPTION OF PREFERRED EMBODIMENTS

A lock mechanism of the present invention, in brief, includes a latch comprising: a first surface; a second surface; and a lock groove disposed between the first and second surfaces. In the latch, a containing space for allowing a striker to be contained or stored therein is defined so as to be situated behind or at the rear of the second surface. The first and second surfaces are each formed as a permitting guide surface which permits sliding passage of a front leg of the striker therealong, upon either of the first and second surfaces being forcibly contacted with by the front leg. A third surface is defined in an inward edge of the containing space. This third surface serves as a stopper adapted for non-sliding contact with the front leg to stop the latch and also causes alignment of a rear leg of the striker with the lock groove.

Figure 1:
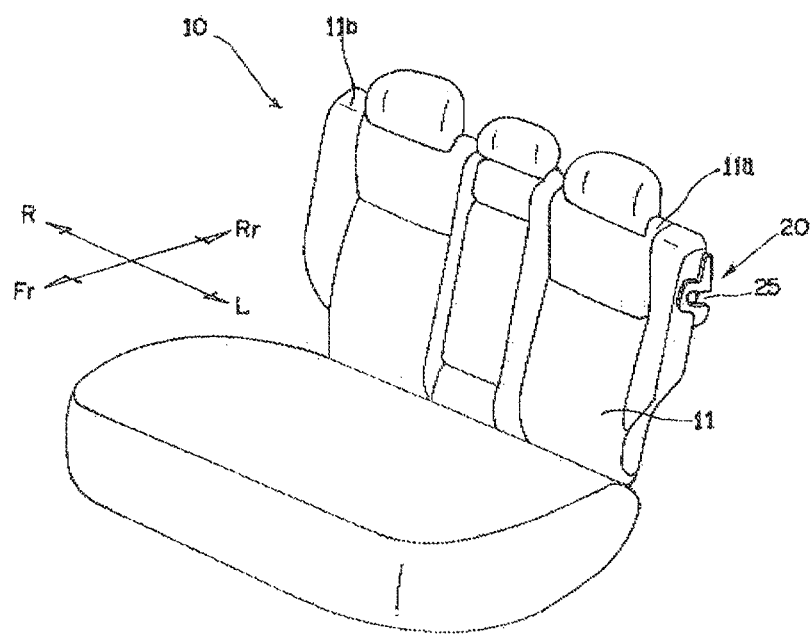
FIG. 1: A perspective view showing a forwardly facing side of a rear seat provided with one mode of lock mechanism in accordance with the present invention.
Figure 2:
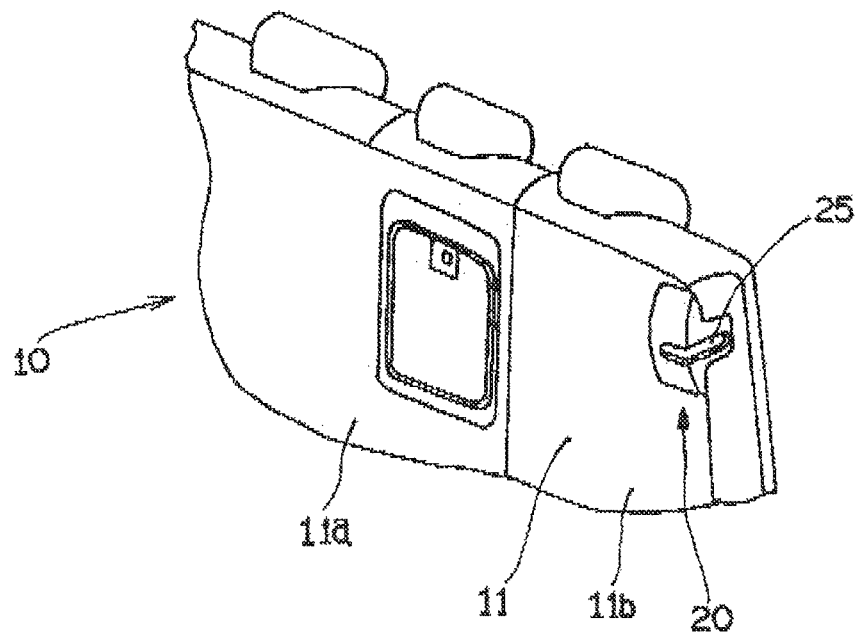
FIG. 2: A partly broken perspective view showing a rearwardly facing portion of the rear seat provided with such one mode of lock mechanism in accordance with the present invention.
Figure 3:
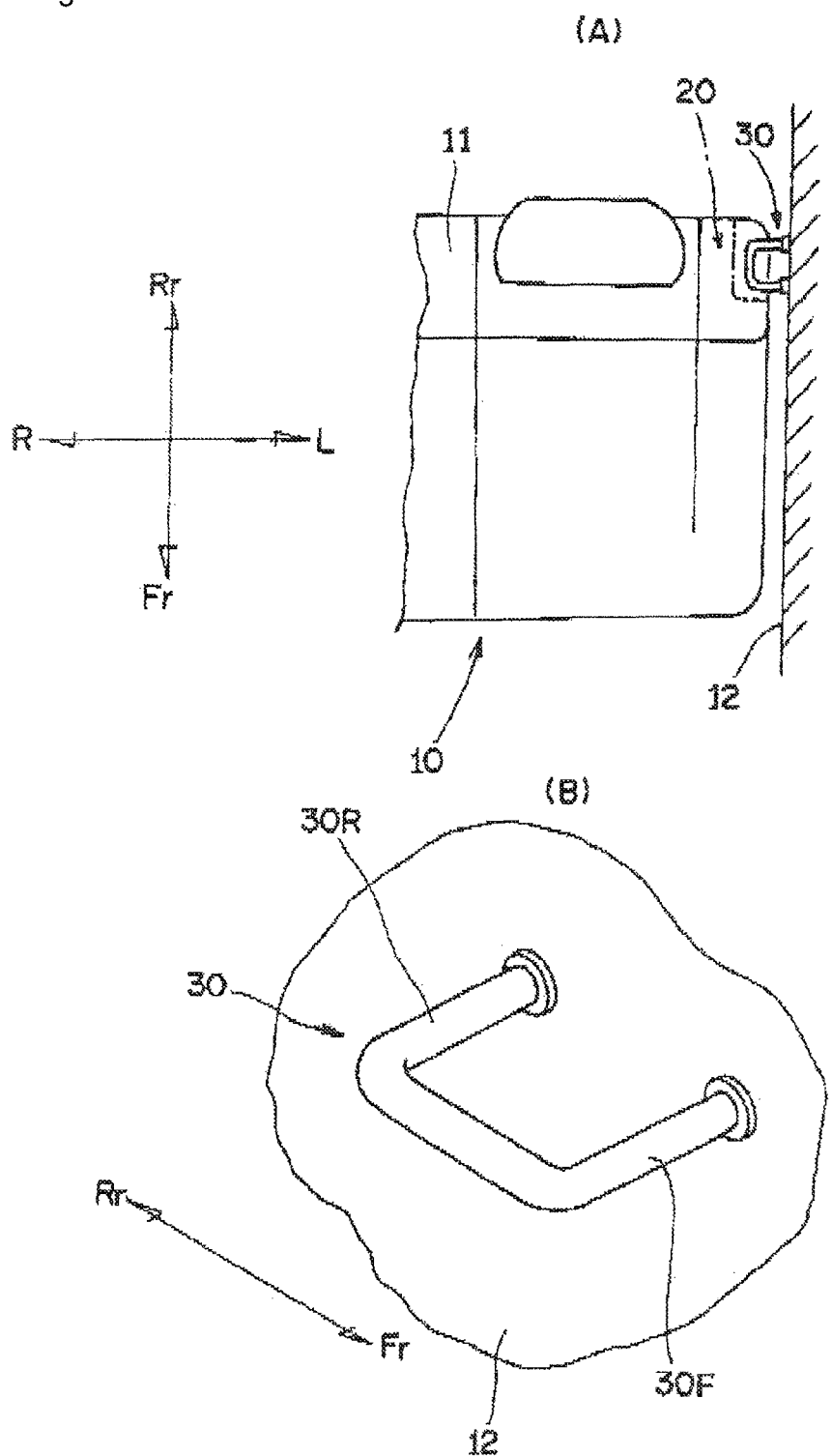
FIG. 3.

Referring to the drawings, one exemplary embodiment of the present invention will now be described in detail. FIGS. 1 and 2 are: a perspective view showing a forward side of a rear seat; and a partly broken perspective view showing a rearward side of the rear seat, respectively, wherein the rear seat is provided with one exemplary mode of lock mechanism in the present invention, which will be described hereinafter. FIGS. 3(A) and 3(B) are: a schematic plan view of the rear seat; and a perspective view of a striker provided on a side wall of vehicle body, respectively. Note that the forward, rearward, leftward and rightward directions of the rear seat are designated by Fr, Rr, L and R, respectively, in the drawings, and it is to be understood that those directions are defined in reference to a seat occupant on the rear seat.

As shown in FIGS. 1 and 2, a seat back 11 of a rear seat 10 is a split seat back composed of two separate seat back sections, and, as shown for example, a ratio of one of the two seat back sections to the other thereof is approximately 6:4 in terms of breadth. This sort of seat is known as an "unequally split seat". Specifically, one seat back section occupying 60 percent (the parts 6) of the rear seat is defined as a two-passenger seat back section 11a, whereas the other seat back section occupying 40 percent (the parts 4) of the rear seat is defined as a one-passenger seat back section 11b. Such split seat back 11 is normally so constructed as to be foldable down and provided with a lock mechanism 20 in an upper end area of the lateral wall portion (or left and right lateral wall portions) thereof. For example, two lock mechanisms 20 may respectively be provided in the two upper end areas respectively of the left and right lateral wall portions of the seat back. Also, as shown in FIGS. 3(A) and 3(B), a side wall 12 of the vehicle body faces toward the lock mechanism 20 provided in the upper end area of the lateral wall portion of the seat back, and a striker 30 of substantially "U" shape is mounted on that side wall 12, wherein the striker has two legs (i.e. a front leg 30F and a rear leg 30R).

Figure 4:
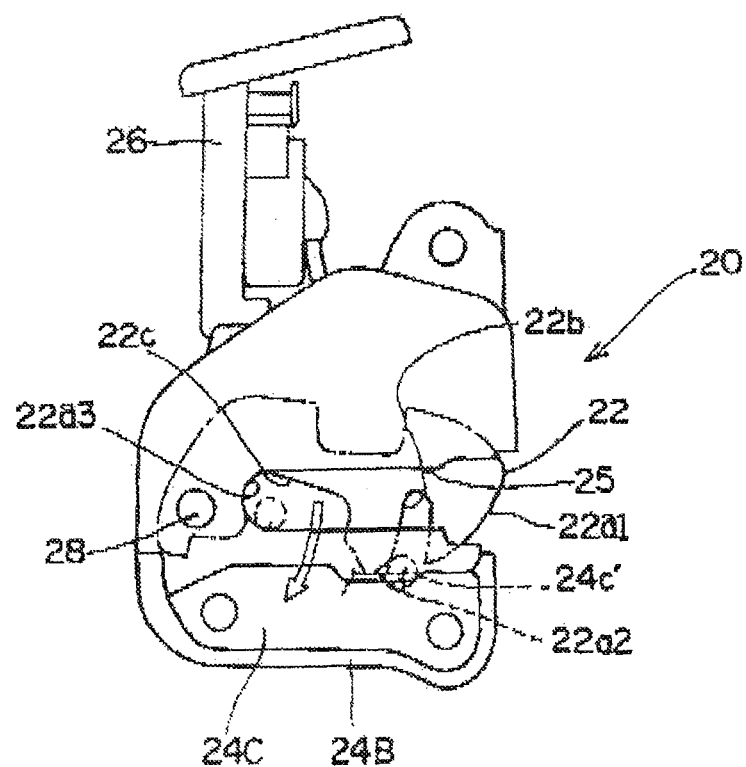
FIG. 4: A schematic front view of the one mode of lock mechanism in accordance with the present invention.
Figure 5:
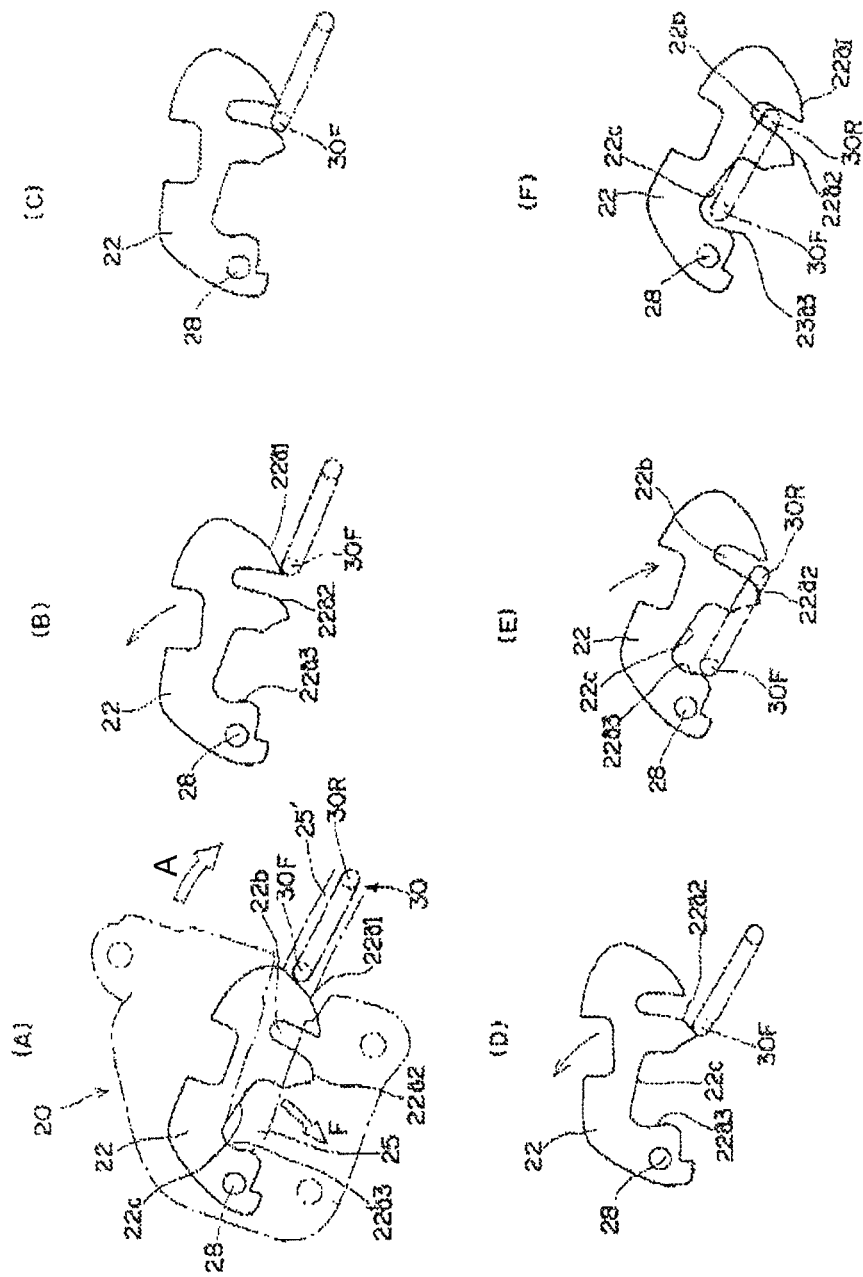
FIG. 5.
Figure 6:
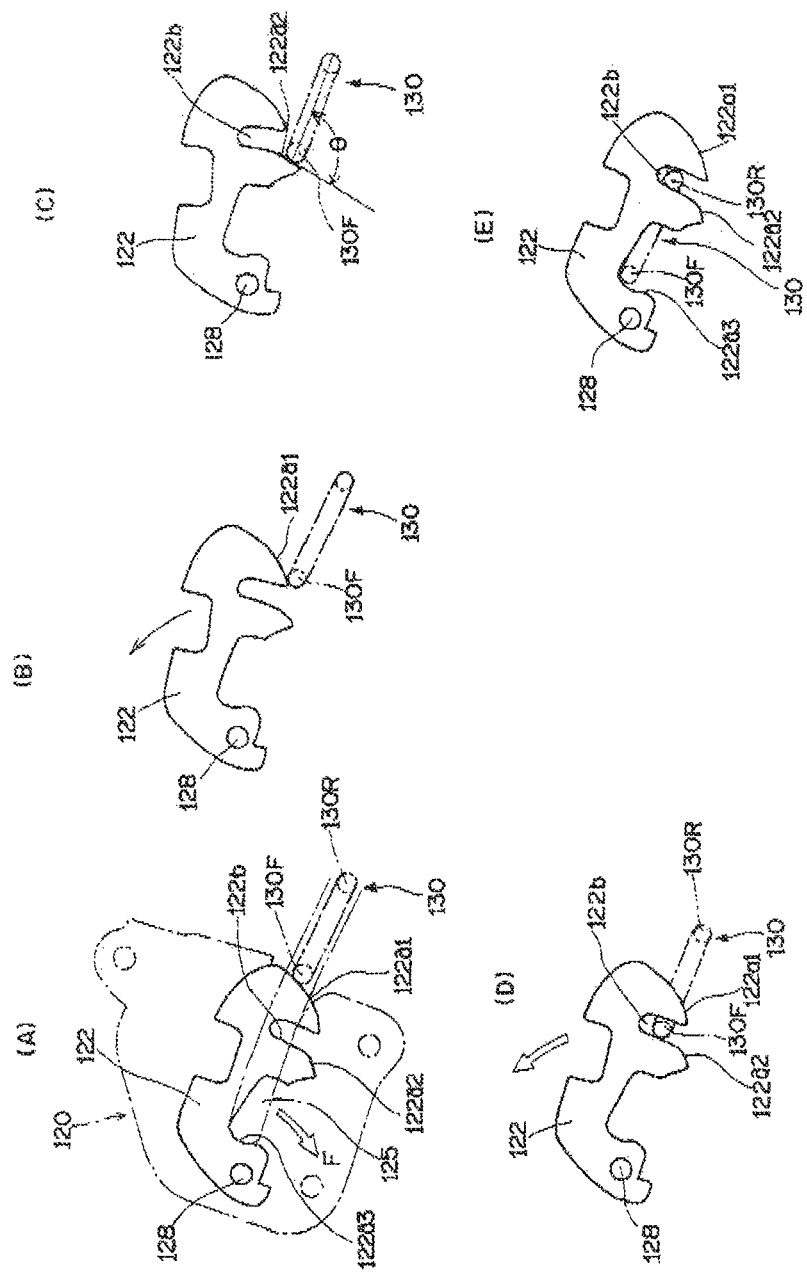
FIG. 6.

FIG. 4 is a schematic front view of the above-described one exemplary mode of lock mechanism in the present invention. Since a basic construction of lock mechanism of this kind is known, as described previously, any further detailed description thereon is omitted. Hereinafter, a description will be made of the construction and actions of a lock mechanism which are mainly associated with the present invention.

The lock mechanism 20 is provided as one pre-assembled unit comprising: a base plate 24B; a cover plate 24C; and a latch 22 which is rotatably provided in and between those base and cover plates, with a biasing force applied to the latch. Such one unit of lock mechanism 20 includes a bracket 26 formed integrally therewith. The bracket is fixedly attached to a frame (not shown) provided in the seat back 11, so that the lock mechanism 20 is fixedly mounted on the upper end area of the lateral wall portion of the seat back.

The base plate 24B and the cover plate 24C are coupled with each other by riveting or swaging, or other suitable means, such that an axis 28 is extended therebetween. The latch is provided between those base and cover plates so as to be rotatable relative to the afore-said axis 28 (or a point on which the latch is rotatably supported). In this regard, as a biasing means, a torsion spring may be wound about the axis 28 (an axis of rotation), for example, thereby applying a biasing force F to the latch so as to biasingly cause rotation of the latch about that axis of rotation in a clockwise direction as indicated by the arrow in FIG. 4. Under such biasing force, the latch is normally kept in contact with an inward surface 24c' (as a stopper) of an upwardly bent portion of the cover plate 24C. Therefore, at that point, a home position of the latch is defined.

A cut-away portion 25 is formed in the lock mechanism 20 by cutting away a predetermined region of each of the base plate 24B and the cover plate 24C. The latch 22 is so formed to have: a first surface 22a1 defined in the outer edge thereof; a lock groove 22b shown to be situated behind or at the rear of the first surface, wherein the lock groove assumes a shape of elongated hole and is so configured as to allow one of the afore-said two legs of the striker to be inserted and retained therein in an embraced way; a second surface 22a2 defined at one inner edge of the lock groove; and a containing space 22c shown to be situated behind or at the rear of the second surface, wherein the containing space is so configured as to allow the front leg of the striker to be contained or stored therein. In this regard, it is to be noted that the first surface defined in the outer edge of the latch extends across the cut-away portion 25, while being partially exposed from that cut-away portion.

The striker 30 is arranged on the side wall 12 of vehicle body, such that both front and rear legs 30F and 30R thereof are disposed on a locus along which the cut-away portion 25 is to be displaced when the seat back is unfolded and moved upwardly to the upright position.

FIGS. 5(A) to 5(F) are diagrams illustrating actions of the afore-said latch of the lock mechanism during unfolding and upward movement of the seat back of the rear seat to the upright position, at a step of installing the rear seat in a vehicle body.

Referring now to the FIGS. 5(A) to 5(F), the actions of the latch of the lock mechanism will be described. As normally known in the art, the seat is first mounted on the vehicle body, with the seat back thereof being in a folded-down state. Thereafter, the seat back 11 is unfolded upwardly to a seating position (or upright position). The direction of such unfolding of seat back is indicated by the arrow A.

As the seat back 11 is unfolded upwardly towards the upright position, the cut-away portion 25 in the lock mechanism is displaced along a locus which is indicated by the designation 25'. While the cut-away portion 25 is being displaced along the locus 25', the front leg 30F first enters that cut-away portion 25, because the front and rear legs 30F and 30R are situated on such locus, as stated earlier. Then, the first surface 22a1, defined in the outer edge of the latch and so arranged as to extend across the cut-away portion 25, is brought into contact with the front leg. (See FIG. 5(A))

The foregoing first surface 22a1, defined in the outer edge of latch, is formed as a permitting guide surface which permits the latch to be rotatively moved therealong against the biasing force F, upon the first surface being forcibly contacted by the front leg 30F of the striker. Thus, for example, the first surface 22a1 is so formed to provide a substantially arcuate and sloped surface. By virtue of such arrangement, the latch 22 is rotated, while being guided along that first surface 22a1 (permitting guide surface) thereof, against the biasing force F, in a direction away from the front leg 30F, with the first surface sliding on and past the front leg. In other words, the latch 22 is rotated about the axis of rotation 28 in a counter-clockwise direction, as indicated by the arrow. (See FIG. 5(B))

Thus, the latch 22 is rotated, with the first surface thereof sliding on and past the front leg 30F of the striker. With further upward unfolding of the seat back 11, the second surface 22a2, situated at the rear of the first surface 22a1, is brought into contact with the front leg. (See FIG. 5(C)) This second surface 22a2, similarly to the first surface 22a1, is formed as a permitting guide surface which permits the latch to be rotatively moved therealong against the biasing force F, upon the second surface being forcibly brought into contact with the front leg 30F. Hence, the second surface 22a2 is also so formed to provide a substantially arcuate and sloped shape, like the first surface 22a1, for instance. By virtue of such arrangement, when the second surface 22a2 (a guide surface) is forcibly brought into contact with the front leg 30F, the latch 22 is rotated counterclockwise against the biasing force F, while being guided along the second surface 22a2 thereof, so that the second surface slides on and past the front leg 30F. (See FIG. 5(D))

In this context, the first and second surfaces 22a1 and 22a2 may each be formed in any other desired shape, insofar as the shape provides the following effect: upon forcible contact of either of the two surfaces 22a1 and 22a2 with the front leg 30F, a reaction force is applied from the front leg 30F to either of those two surfaces along a line above a center of the rotation axis 28 of the latch 22, thereby causing the latch 22 to rotate upwardly (or in the counterclockwise direction).

As the latch 22 is rotated counterclockwise, the second surface 22a2 thereof slides on and past the front leg 30F. At this moment, while the front leg is being contained or stored in the containing space 22c defined inwardly in the latch adjacent to the second surface 22a2, the biasing force F now causes the latch to rotate clockwise as indicated by the arrow and thus return to the home position thereof. Under such a state, with further upward unfolding of the seat back 11, the second surface 22a2 of the latch is brought into contact with the rear leg 30R of the striker. Because the second surface 22a2 serves as the guide surface stated above, the latch 22 is therefore rotated relative to the striker against the biasing force F, with the second surface thereof sliding on and past the rear leg 30R. (See FIG. 5(E))

Here, in accordance with the present invention, a third surface 22a3 is defined in the inward edge of the containing space 22c of the latch in such a manner as to be contacted by the front leg straight so as not to slide thereon, and therefore, such third surface 22a3 serves as a stopper. Further, the third surface 22a3 is arranged in that inward edge of the containing space at a point where the front leg 30F will come to contact with the third surface, while the rear leg 30R will be brought in alignment with the lock groove 22b upon contact of the front leg with the third surface. With such arrangement, therefore, after the first surface 22a1 of the latch has slid on and past the rear leg 30R, it is possible to continue unfolding the seat back upwardly until the front leg 30F contacts the third surface 22a3, wherein the third surface 22a3 is defined more inwardly in the latch than the second surface 22a2 (that is, the third surface is a surface recessed far deeply in the latch relative to the second surface). (See FIG. 5(E)) Thus, by unfolding the seat back upwards continuously, the front leg 30F comes into contact with the third surface 22a3, whereupon the seat back 11 is prevented from moving further upward, because the third surface 22a3 serves as a stopper as mentioned above.

At the point of time when the front leg 30F contacts the third surface 22a3 (stopper), the rear leg 30R is just aligned over the lock groove 22b which assumes an elongated hole shape, wherein the lock groove 22b is defined between the first and second surfaces. Then, as the latch is rotated clockwise under the biasing force F, the rear leg is inserted and retained in the lock groove in an embraced manner. (See FIG. 5(F)) With such biased and embracing engagement of the lock groove 22b with the rear leg 30R, the seat back is now locked at a predetermined design reference position.

As can be appreciated from the description above, because of the second surface 22a2 being a guide surface, even when the second surface 22a2 is forcibly contacted by the front leg 30F, the latch is still rotatively moved relative to the striker, while being guided along that second surface, and displaced in a direction away from the front leg, with the second surface sliding on and past the front leg. Hence, during such rotative displacement of the latch, the front leg is not engaged in the lock groove 22b. Accordingly, continued upward unfolding of the seat back to the extent that the third surface 22a3 contacts the front leg 30F results in the rear leg being inserted and engaged in the lock groove 22b in an embraced manner, whereby the seat back can be set and retained at a design reference position. In other words, at the step of installing the seat in a vehicle body, the seat back can be set and retained rapidly at the design reference position, without requiring any lock-off operation. Thus, by simply unfolding the seat back upwards continuously, the seat back can be automatically set and retained at that design reference position, hence enabling a rapid setting of the seat back in the vehicle body.

As described above, in accordance with the present invention, the second surface is formed as a permitting guide surface, and therefore, by simply unfolding the seat back upwards continuously, the seat back can be automatically set and retained at a design reference position, without any lock-off operation, thereby enabling a rapid setting of the seat back in the vehicle body.

In this context, in the latch, the second surface 22a2 is defined as a part of the inward edge of the lock groove 22b and serves as a guide surface, as stated above. Taking such arrangement into account, it is possible in the present invention to stop unfolding the seat back just at the time when the second surface contacts the front leg 30F of the striker and let the lock groove engage the front leg embracingly, thereby defining a first lock point of the seat back at a point where the lock groove embracingly engages the front leg. Such first lock point corresponds to the forward lock point defined in the conventional two-step lock mechanism, and therefore the seat back can be locked at a forward lock point as similar to the conventional forward lock point. Hence, in accordance with the instant application for the present invention, the seat back may optionally be locked at the first lock point, quite easily, without any unlocking operation required.

The above-described exemplary embodiment is intended to explain one aspect of the present invention and in no way restricts the present invention thereto. It is therefore to be understood that any modification and change can be applied to the present invention, without departing from the technical scopes encompassed and claimed by the invention.

The present invention can be applied to any rear seat of fold-down type which may be used as a second seat, a third seat, or the like.

What is claimed is:

1. A lock mechanism for use with a rear seat, which is provided to a lateral portion of a seat back of the rear seat, wherein said seat back is foldable forwardly and downwardly, said lock mechanism including:
   a latch workable for engagement with one of a pair of front and rear leg portions of a striker under a biasing force, said latch having:
      a first surface defined in the outer edge thereof;
      a lock groove defined at a point behind said first surface, said lock groove being configured to allow one of said pair of front and rear leg portions to be engaged therein in an embraced manner;
      a second surface defined in an inner edge of said lock groove;
      a containing space defined at a point behind said second surface, said containing space being configured to allow the front leg portion of said pair of front and rear leg portions to be contained therein, and
      a third surface defined in an inward edge of said containing space of said latch, said third surface serving as a stopper adapted for non-sliding contact with said front leg portion to stop the latch,
   wherein said first and second surfaces of said latch are each formed as a permitting guide surface which permits the latch to move past said front leg portion in a sliding contact thereon, upon said front leg portion being contacted by each respective one of said first and second surfaces, thereby permitting said front leg portion to pass over said lock groove of the latch, and
   wherein said third surface is arranged in said inward edge of said containing space at a point where said front leg portion of said striker is to contact the third surface, and said rear leg portion of said striker is to be brought in alignment with said lock groove upon contact of said front leg portion with the third surface.

* * * * *